(12) United States Patent
Vijay

(10) Patent No.: US 8,691,014 B2
(45) Date of Patent: Apr. 8, 2014

(54) SYSTEM AND NOZZLE FOR PREPPING A SURFACE USING A COATING PARTICLE ENTRAINED IN A PULSED FLUID JET

(75) Inventor: Mohan M. Vijay, Ottawa (CA)

(73) Assignee: VLN Advanced Technologies Inc. (CA)

( * ) Notice: Subject to any disclaimer, the term of this patent is extended or adjusted under 35 U.S.C. 154(b) by 0 days.

(21) Appl. No.: 13/111,412

(22) Filed: May 19, 2011

(65) Prior Publication Data
US 2011/0247554 A1    Oct. 13, 2011

Related U.S. Application Data

(62) Division of application No. 12/759,302, filed on Apr. 13, 2010, now Pat. No. 8,389,066.

(51) Int. Cl.
| | | |
|---|---|---|
| *B05C 11/00* | (2006.01) | |
| *B05B 7/12* | (2006.01) | |
| *A62C 5/02* | (2006.01) | |
| *B23K 1/20* | (2006.01) | |
| *B24C 5/04* | (2006.01) | |
| *B05D 1/40* | (2006.01) | |
| *B05D 1/04* | (2006.01) | |
| *B05D 3/12* | (2006.01) | |

(52) U.S. Cl.
USPC ............. 118/603; 118/72; 118/684; 427/478; 427/474; 427/290; 427/292; 451/102; 451/446; 239/9; 239/407; 228/205

(58) Field of Classification Search
USPC ............ 427/290, 292, 446; 451/99, 102, 446; 239/4, 407; 228/205; 118/72, 712
See application file for complete search history.

(56) References Cited

U.S. PATENT DOCUMENTS

| | | | | |
|---|---|---|---|---|
| 2,949,900 A | * | 8/1960 | Bodine | ......................... 123/472 |
| 3,398,758 A | * | 8/1968 | Unfried | ..................... 116/137 R |
| 3,729,871 A | | 5/1973 | Taylor | |
| 4,067,150 A | * | 1/1978 | Merrigan | ........................ 451/99 |

(Continued)

FOREIGN PATENT DOCUMENTS

| | | |
|---|---|---|
| DE | 10158622 | 6/2003 |
| DE | 102005061401 | 6/2007 |

(Continued)

OTHER PUBLICATIONS

Examination Report from corresponding EP Application No. 10197292.5, Mar. 4, 2012.

(Continued)

*Primary Examiner* — Dah-Wei Yuan
*Assistant Examiner* — Karl Kurple
(74) *Attorney, Agent, or Firm* — Gardner, Linn, Burkhart & Flory, LLP

(57) ABSTRACT

Prepping a surface entails entraining a coating particle into a fluid stream, directing the fluid stream containing the coating particle at the surface to be prepped to thereby prep the surface using the coating particle. The prepped surface can then be coated using the same or substantially similar coating particle. This technique can be used with a continuous airjet, a forced pulsed airjet, a continuous waterjet or a forced pulsed waterjet as the carrier stream. This invention solves the problem of foreign blasting particles becoming embedded in the atomic matrix of the surface to be prepped, which can result in unpredictable behavior of the surface properties and even catastrophic failure.

8 Claims, 4 Drawing Sheets

(56) References Cited

U.S. PATENT DOCUMENTS

| | | | |
|---|---|---|---|
| 4,478,368 A * | 10/1984 | Yie | 239/430 |
| 4,555,872 A * | 12/1985 | Yie | 451/40 |
| 4,569,161 A * | 2/1986 | Shipman | 451/99 |
| 4,666,083 A | 5/1987 | Yie | |
| 4,681,264 A * | 7/1987 | Johnson, Jr. | 239/589.1 |
| 4,765,540 A * | 8/1988 | Yie | 239/8 |
| 5,018,317 A * | 5/1991 | Kiyoshige et al. | 451/102 |
| 5,155,946 A * | 10/1992 | Domann | 451/75 |
| 5,291,957 A * | 3/1994 | Curlett | 175/67 |
| 5,421,516 A * | 6/1995 | Saitou et al. | 239/121 |
| 5,538,191 A * | 7/1996 | Holl | 241/1 |
| 5,547,376 A * | 8/1996 | Harrel | 433/116 |
| 5,643,058 A * | 7/1997 | Erichsen et al. | 451/99 |
| 5,752,829 A * | 5/1998 | Goldsmith et al. | 433/88 |
| 5,849,099 A * | 12/1998 | McGuire | 134/10 |
| 5,862,871 A * | 1/1999 | Curlett | 175/340 |
| 5,927,306 A * | 7/1999 | Izumi et al. | 134/155 |
| 6,000,308 A * | 12/1999 | LaFountain et al. | 83/53 |
| 6,026,584 A * | 2/2000 | Wegman | 33/613 |
| 6,036,584 A * | 3/2000 | Swinkels et al. | 451/75 |
| 6,189,547 B1 * | 2/2001 | Miyamoto et al. | 134/57 R |
| 6,223,996 B1 * | 5/2001 | Yamamoto | 239/102.2 |
| 6,244,927 B1 * | 6/2001 | Zeng | 451/2 |
| 6,305,261 B1 * | 10/2001 | Romanini | 83/53 |
| 6,444,259 B1 | 9/2002 | Subramanian et al. | |
| 6,464,567 B2 * | 10/2002 | Hashish et al. | 451/38 |
| 6,695,686 B1 * | 2/2004 | Frohlich et al. | 451/102 |
| 6,797,342 B1 * | 9/2004 | Sanchez et al. | 427/600 |
| 6,935,860 B2 * | 8/2005 | Rasmussen | 433/88 |
| 7,108,585 B1 * | 9/2006 | Dorfman et al. | 451/38 |
| 7,549,429 B2 * | 6/2009 | Nunomura et al. | 134/184 |
| 7,594,614 B2 | 9/2009 | Vijay et al. | |
| 7,762,869 B2 * | 7/2010 | Yoon | 451/8 |
| 2002/0066770 A1 | 6/2002 | James et al. | |
| 2002/0098776 A1 * | 7/2002 | Dopper | 451/2 |
| 2004/0097171 A1 * | 5/2004 | Liwszyc et al. | 451/36 |
| 2006/0113400 A1 * | 6/2006 | Dodson | 239/14.2 |
| 2007/0063066 A1 * | 3/2007 | Vijay et al. | 239/99 |
| 2007/0098912 A1 | 5/2007 | Raybould et al. | |
| 2008/0160332 A1 * | 7/2008 | Dighe et al. | 428/554 |
| 2008/0201973 A1 * | 8/2008 | Chabot et al. | 33/533 |
| 2009/0200390 A1 * | 8/2009 | Babaev | 239/4 |
| 2009/0224066 A1 * | 9/2009 | Riemer | 239/102.2 |
| 2010/0015892 A1 | 1/2010 | Vijay et al. | |
| 2010/0124872 A1 * | 5/2010 | Hashish et al. | 451/99 |
| 2011/0011952 A1 * | 1/2011 | Brusa | 239/407 |
| 2011/0250361 A1 | 10/2011 | Vijay | |

FOREIGN PATENT DOCUMENTS

| | | |
|---|---|---|
| EP | 0647505 | 2/2000 |
| EP | 1016735 | 7/2000 |
| EP | 0703040 | 10/2000 |
| EP | 1160339 | 12/2001 |
| EP | 2145689 | 1/2010 |
| GB | 2335202 | 1/2003 |
| JP | 58052467 | 3/1983 |
| JP | 59070757 | 4/1984 |
| JP | 61037955 | 2/1986 |
| WO | 9213679 | 8/1992 |
| WO | 9814638 | 4/1998 |
| WO | 2005042177 | 5/2005 |

OTHER PUBLICATIONS

Vijay, Mohan V., "Design and development of a prototype pulsed waterjet machine for the removal of hard coatings", BHR Group Conference Series—14th International Conference on Jetting Technology, 21-23, pp. 39-57, Sep. 1998.

European Search Report from European Patent Application No. EP10197292, Apr. 2012.

* cited by examiner

SYSTEM AND NOZZLE FOR PREPPING A SURFACE USING A COATING PARTICLE ENTRAINED IN A PULSED FLUID JET

CROSS-REFERENCE TO RELATED APPLICATIONS

This application is a divisional of U.S. patent application Ser. No. 12/759,302, filed Apr. 13, 2010, which is hereby incorporated herein by reference in its entirety.

TECHNICAL FIELD

The present invention relates generally to surface prepping and, in particular, to prepping surfaces using abrasive particles (or blasting particles) entrained into a continuous or pulsed waterjet or airjet.

BACKGROUND

Prior to applying a coating to a surface, it is generally necessary to prep the surface to ensure that the surface has the appropriate surface roughness. Prepping the surface is often accomplished using grit blasting (e.g. using cast iron shot or aluminum oxide) or by using an abrasive-entrained fluid. A variety of abrasives are known in the art, for example, sand, garnet, Zeolite (which are aluminosilicates of sodium, potassium, calcium or magnesium), alumina, and grit (i.e. crushed ferrous or synthetic abrasives). These abrasive particles (herein referred to as "blasting particles") can be used to prep a surface, be it metallic or non-metallic, to a desired surface roughness.

Once the prepping of the surface is complete, coating material, which may be in the form of coating particles, is applied to the prepped surface. Coating particles can be applied using various techniques such as, for example, thermal spray coating (including combustion powder flame spray and High Velocity Oxy-Fuel), plasma spray, cold spray, etc.

Once the surface prepping is complete, the surface may need to be cleaned or washed, either by rinsing or other such method to remove the blasting particles that may remain on the surface to be coated. In many cases, this is accepted as satisfactory. However, there are many instances where the particles regularly used for blasting become embedded in the atomic matrix of the surface to be coated. This is highly undesirable as even a single foreign particle may adversely affect the micro-structural properties of the surface to be coated. For instance, when the surface is coated with the high-velocity oxy-fuel (HVOF) process using metallic particles such as tungsten, the coating particles will not adhere to the surface at the location where the foreign particle is embedded. Thus, the point where the particle resides may become a point of weakness of the surface, and in service may lead to unpredictable behaviour, including catastrophic failure.

An improvement on this conventional prepping process would thus be highly desirable.

SUMMARY

The present invention provides a novel method and apparatus that eliminates the problems associated with the use of foreign blasting particles for surface prepping. The problems associated with the prior art are overcome by using the coating particle as a blasting particle (or abrasive particle) for prepping the surface to be coated. In other words, the surface prepping of a component is done using the same coating particle that is to be used to coat the surface of the component. This invention will not only eliminate the problem of embedding a foreign particle into the surface to be coated, but also offers many other advantages leading to considerable savings in cost and in the abatement of pollution.

For example, in the high velocity oxy-fuel (HVOF) coating technique, tungsten carbide is one of the particles used for coating a surface by entraining and propelling the particle in the flame jet produced by combustion of volatile liquids such as kerosene in oxygen/air. The same system can be used for prepping the surface using tungsten carbide particles without combustion. In other words, in the first stage, the surface to be coated is prepped with tungsten carbide particles. In the second stage, the same particles are used in the flame for coating the surface. Since the same particles are used for both prepping and coating, the problem of disposing of the conventional grit-blast particles is totally eliminated. Furthermore, as cleaning the blasted surface is not required, additional savings in time and cost will be achieved. Moreover, the novel process produces less pollution as disposal of waste products is eliminated altogether since blasting particles that do not adhere may be recycled and reused for coating. The same methodology applies in other coating techniques such as the plasma coating technique. In other words, the coating particles used as blasting particles for prepping the surface can be entrained in high-speed fluid jets. A further improvement in the prepping technique can be achieved by entraining the coating particles in continuous or pulsed waterjet or in continuous or pulsed airjet (using, for example, the techniques disclosed in U.S. Pat. Application Publication US 2010/0015892 A1, published Jan. 21, 2010 and entitled "Method And Apparatus For Prepping Surfaces With A High-Frequency Forced Pulsed Waterjet"). Therefore, the coating particle is used as the blasting particle for prepping the surface prior to coating.

This innovative method thus preps a surface using an abrasive-entrained waterjet or airjet wherein the same or similar particle that is to be used for subsequently coating the surface is also used as a blasting particle for first prepping the surface. In other words, the coating particle is entrained into the waterjet or airjet (or other fluid stream) for prepping the surface. The waterjet or airjet can be either a continuous stream or a pulsed (modulated) stream. Accordingly, prepping operations can be done with the same coating particle used to coat the surface, i.e. with only one type of coating particle that is used for both prepping and coating, as opposed to using one type of abrasive particle for prepping and then a different type of particle for coating.

In accordance with a main aspect of the present invention, an apparatus for prepping a surface comprises a nozzle for directing a fluid stream at the surface to be prepped and a container for containing a supply of coating particles. The apparatus further includes a particle delivery subsystem connected to the nozzle for delivering the coating particles into the nozzle to thereby entrain the coating particles into the fluid stream. The apparatus also includes a pressure source for pressurizing the fluid stream to generate a pressurized fluid stream that is directed through the nozzle at the surface to be prepped to thereby prep the surface with the coating particles.

In accordance with another main aspect of the present invention, a system for prepping a surface using a coating particle and then coating the surface with the same type of coating particle includes a nozzle for blasting the surface with the coating particle to thereby prep the surface to a desired surface roughness for subsequent coating, wherein the same nozzle is also used for coating the surface with the same type of coating particle used to prep the surface. The system includes a container for containing a supply of the coating particles. The system includes a particle delivery subsystem connected to the nozzle via one or more particle inlets for delivering the coating particles from the container through the one or more particle inlets into the nozzle to thereby entrain the coating particles into the fluid stream. The system includes a pump for pressurizing the fluid stream to generate a pressurized fluid stream that is directed through the nozzle at the surface to be prepped to thereby prep the surface with the coating particles. The system further includes a control system for controlling the apparatus for switching being a first mode of operation in which coating particles are entrained into the pressurized fluid stream to thereby prep the surface and a second mode of operation in which substantially the same coating particles are propelled at the surface to thereby coat the surface.

In accordance with yet another main aspect of the present invention, a prepping and coating system comprises a nozzle for directing a fluid stream carrying coating particles at a surface to be sequentially prepped and then coated using the same type of coating particles, the nozzle comprising particle inlets for injecting the coating particles into the nozzle, the nozzle including a mixing chamber for mixing the coating particles with the fluid stream. The system also includes a container for containing the coating particles and a particle delivery subsystem connecting the container to the nozzle for delivering the coating particles into the nozzle to thereby entrain the coating particles into the fluid stream, the particle delivery subsystem including a metering system for metering the coating particles. The system also includes a pump for pressurizing the fluid stream to generate a pressurized fluid stream that is directed through the nozzle at the surface to be prepped to thereby prep the surface with the coating particles, and a control system for controlling the particle delivery subsystem to control delivery of the coating particles into the nozzle.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
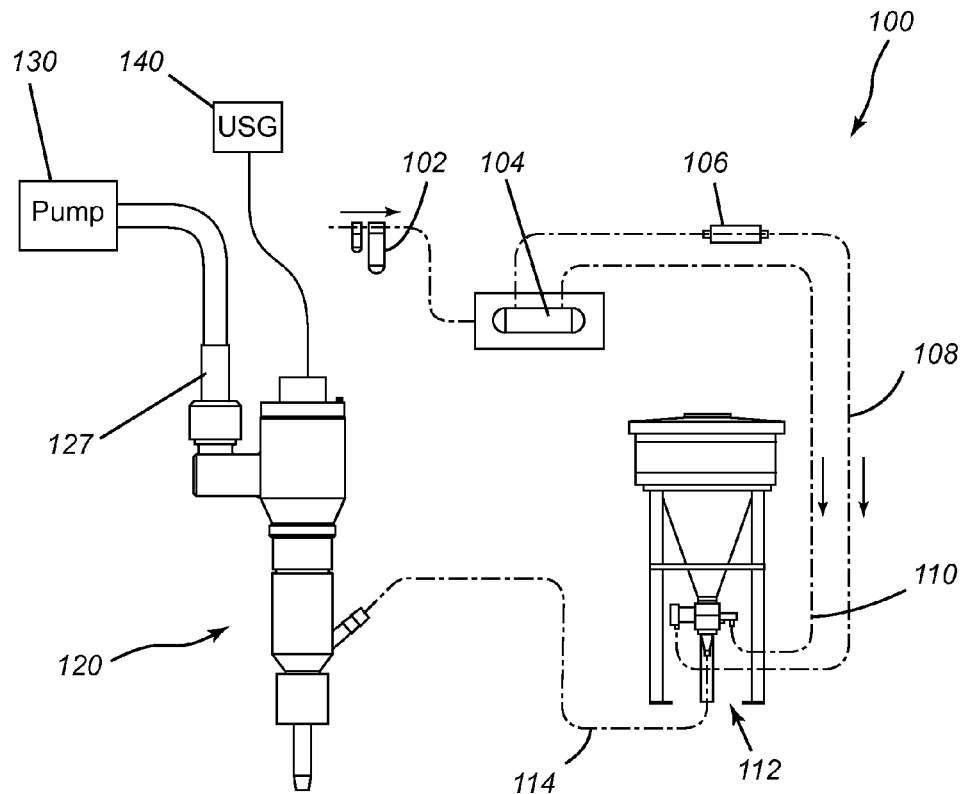
FIG. 1 is an illustration of a pulsed waterjet system that entrains a coating particle as a blasting particle for surface prepping.

In general, the present invention is directed to a novel method and apparatus for prepping a surface of a component using a coating particle as the blasting particle (i.e. as the abrasive particle). In other words, the coating particle itself is used as the blasting particle (abrasive particle) that preps the surface prior to coating the surface with the same type of particle. The coating particle can be carried by a pulsed waterjet, a continuous waterjet, a pulsed airjet, a continuous airjet or any other pulsed or continuous (low-temperature or high-temperature) fluid stream. A pulsed waterjet is believed by Applicant to be the best mode of implementing this technology because of the maximal erosive effects (mass removal rates) associated with pulsed waterjet technology. Because the coating particle is ingeniously used as the blasting particle, the problems associated with grit-blasting or prepping using a different particle than what is used to coat the surface are eliminated. This prepping technique not only saves time and cost as there is no need to clean or rinse the grit-blasted surface, but also reduces waste and cleanup time (because a different abrasive is not used). Furthermore, this novel technique enhances the bonding or adhesion of the coating particle to the prepped surface since no foreign abrasive particles are embedded into the surface to be coated.

In the various embodiments of this invention, which will be described below in greater detail, a pulsed or continuous waterjet or airjet apparatus is used to entrain a coating particle such as, for example, a thermal spray coating particle or other coating particle, that is to be applied to the surface after the surface prepping is complete. By entraining the coating particle into the fluid stream, the coating particle is thus used as an abrasive or blasting particle. In other words, the coating particle and the abrasive particle are the same, or at least highly similar in composition, hardness, granularity, etc. This represents a very substantial innovation over the prior art. Conventionally, a surface is prepped using an abrasive to produce a desired surface finish or surface roughness. This surface finish or surface roughness is typically determined ahead of time by the type of coating particle that is to be applied. Thus, empirically it is known that optimal particle retention (coating-surface adhesion) is achieved by prepping the surface to within a certain range of surface roughness. In the prior art, the surface is then typically prepped to within that desired range of surface roughness using a standard abrasive particle (blasting particle) such as, for example, grit, garnet or Zeolite. The problem identified by Applicant is that remnants of blasting particles (abrasive particles) can remain embedded in the atomic matrix of the surface being prepped. These embedded particles can reduce the adhesion of the subsequent coating and/or create local points of weakness leading to unpredictable failure. Applicant has thus realized that this problem can be obviated by using the coating particle as the blasting particle (abrasive particle). This ensures that no foreign particles remain after the prepping. If coating particles are embedded into the atomic matrix of the surface being prepped, then this has no deleterious effect since this particle would have been applied to the surface eventually in the subsequent coating operation. Particles that do not adhere to the surface can be reused or recycled for the subsequent coating stage.

In one embodiment, a coating particle of a slightly different granularity (mesh size) or slightly different composition can be used to prep the surface prior to application of the coating. For example, the coating particles used for prepping may be larger in mesh size than the coating particles used for coating. Using a larger particle to prep the surface is advantageous as these larger particles more closely resemble the larger grit-blast particles that are traditionally used for surface prepping. Despite their larger mesh size, these larger coating particles tend to become smaller in mesh size as they impinge on the surface and are themselves blasted by subsequently impinging particles. A large proportion of the particles that fail to adhere to the surface tend to be these particles of a reduced size. These reduced-size (non-adhered) particles, however, are ideal for coating operations because coating particles used for actually coating should have a smaller mesh size than those used for blasting. Accordingly, these reduced-size particles can be recycled and reused, with optional filtering, for subsequent coating of the prepped surface.

Main embodiments of the present invention will now be described below, by way of example, with reference to the attached drawings.

Coating-Particle-Entrained Pulsed Waterjet

In one embodiment of this invention, a pulsed waterjet apparatus is used to entrain coating particles into the modulated water stream to prep the surface. Pulsed waterjet technology has been developed by Applicant and has been disclosed in U.S. Pat. No. 7,594,614 (Vijay et al.) entitled ULTRASONIC WATERJET APPARATUS and in U.S. Pat. No. 5,154,347 entitled ULTRASONICALLY GENERATED CAVITATING OR INTERRUPTED JET, which are hereby incorporated by reference.

FIG. 1 depicts a pulsed waterjet system 100 having a pulsed jet eductor nozzle and a coating particle supply unit. In the particular example depicted in this figure, the pulsed waterjet system 100 has an air inlet 102 for receiving substantially clean, dry and oil-free air into the air lines of the system, a control valve 104 (e.g. a 4-way, 5-port control valve or any other suitable valve), an isolator valve 106, an air control line 108, a purge air line 110, a particle metering system 112, a particle feed line 114 and a pulsed jet head (i.e. ultrasonic nozzle assembly) 120 for modulating the waterjet to create a pulsed waterjet. The ultrasonic nozzle 120 can be modified from any of the nozzles depicted in U.S. Pat. No. 7,594,614, for example. In addition, as shown schematically in FIG. 1, the system includes a water pump 130 (or other pressure source) for supplying pressurized water into the water inlet 127 of the nozzle 120. The system also includes an ultrasonic generator 140 for generating an ultrasonic drive signal for driving the transducer (i.e. causing the transducer and microtip to oscillate at the desired frequency).

Figure 2:
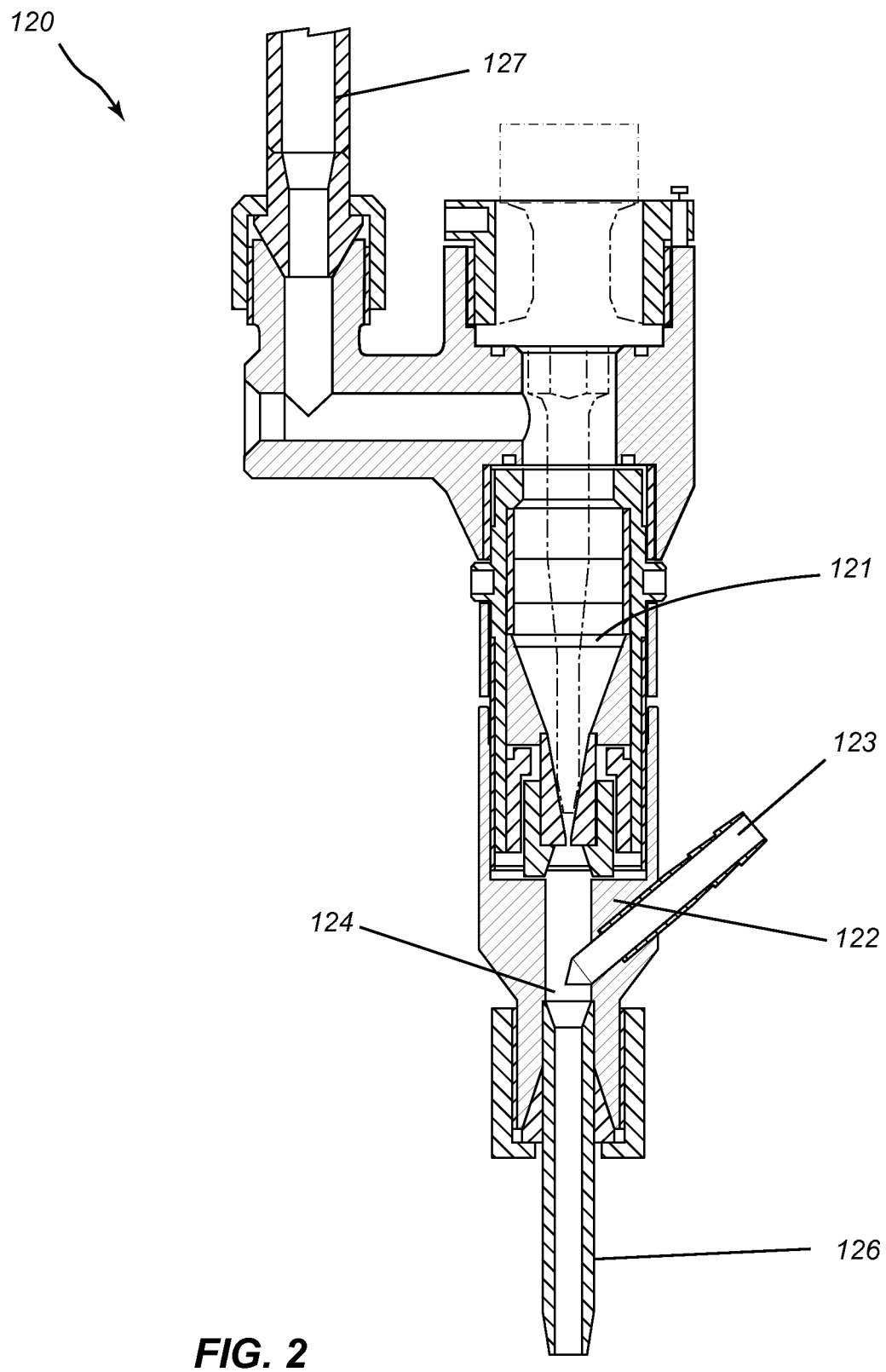
FIG. 2 is an enlarged illustration of the nozzle head used in the system depicted in FIG. 1.

FIG. 2 illustrates the nozzle 120 shown in FIG. 1 in greater detail. As shown in this figure, the nozzle 120 has a piezoelectric or magnetostrictive transducer connected to a microtip 121 for modulating the waterjet. Pressurized water is brought into the nozzle 120 at a water inlet 127. Coating particles are injected or suctioned into the nozzle via an angled particle inlet (suction port) 123. In the particular configuration depicted in FIG. 2, the particle inlet (suction port) is part of a cylindrical body 122 threaded onto the nozzle as an outer annular component surrounding the portion of the nozzle housing the microtip. A mixing chamber 124 is provided downstream of the angled particle inlet (suction port) to mix the particle with the modulated/pulsed waterjet to create a pulsed slurry (i.e., the slurry consists of water and the particles). The nozzle 120 also includes an outlet tube 126 extending from the mixing chamber 124 through which the modulated waterjet passes.

Figure 3:
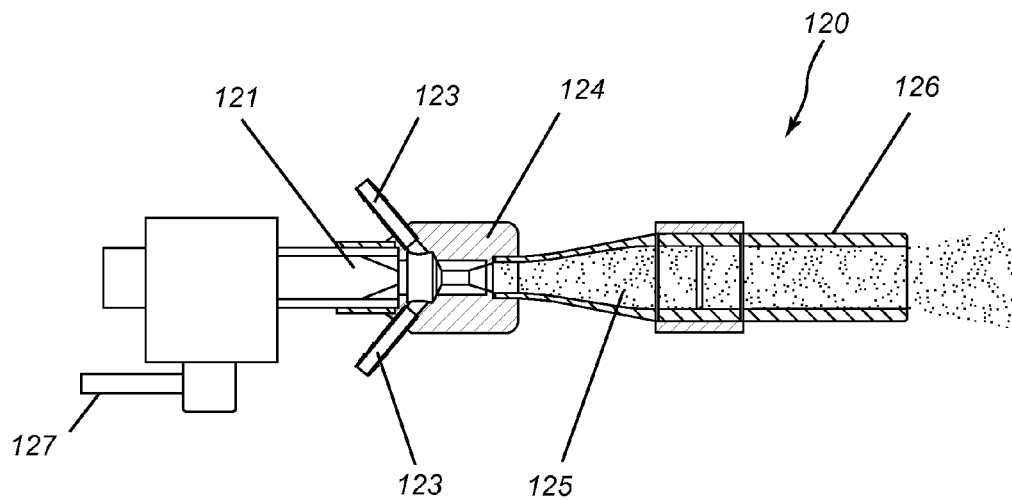
FIG. 3 is an illustration of another embodiment of a nozzle head that can be used in a pulsed waterjet.

FIG. 3 presents another embodiment of a nozzle assembly 120 that can be used with the pulsed waterjet system 100 in order to entrain coating particles for performing surface preparation operations. The nozzle is designed for directing a particle-entrained modulated fluid stream at the surface to be prepped. As shown in this figure, the nozzle 120 has a microtip 121, a pair of angled inlets (suction ports) 123, a mixing chamber 124, and a water inlet 127, as previously described. In addition, the nozzle of FIG. 3 has an adapter (bell-shaped diverging section) 125 connected to the downstream end of the mixing chamber. A tube 126 is then connected to the downstream end of the adapter 125. Changing the sizes of the adapter (125) and the tube (126) will enable to prep small and large parts, that is small or large areas of substrates. The system therefore comprises a particle delivery subsystem connected to the nozzle for delivering a supply of coating particles into the nozzle. In the example setup presented in FIG. 1, this particle delivery subsystem includes the air inlet, the isolator valve, the air control line, the purge line, the hopper and supply lines of the metering system, and the feed line. The system also includes a control system for controlling the apparatus (i.e. system 100). The control system in this particular example includes the flow valve of the particle metering system. This control system can be manually operated or automated (i.e. microprocessor controlled).

Coating-Particle-Entrained Continuous Waterjet

In another embodiment of this invention, the waterjet can be a continuous waterjet instead of a pulsed waterjet. The continuous waterjet can be pressurized to very high pressures to achieve the desired surface preparation effect. The continuous waterjet can be generated using a standard waterjet apparatus having no ultrasonic transducer or by deactivating the ultrasonic transducer in an ultrasonic waterjet apparatus.

Coating-Particle-Entrained Pulsed Airjet

In another embodiment of this invention, a pulsed airjet apparatus can be used to entrain a stream of coating particles as abrasives (blasting particles) into the fluid stream for prepping a surface.

Figure 4:
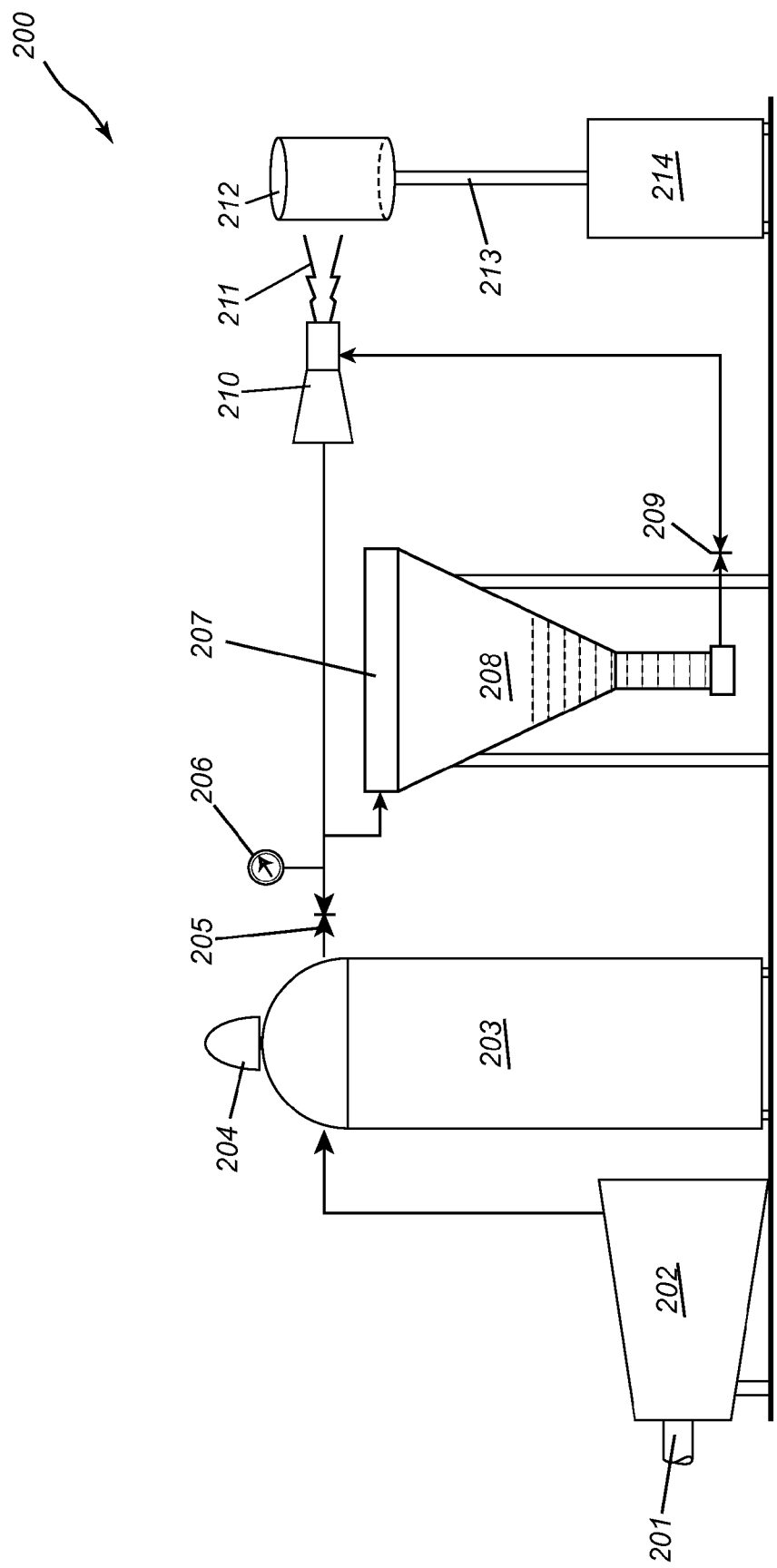
FIG. 4 is a schematic depiction of an airjet system for entraining coating particles into a continuous or pulsed airjet.

FIG. 4 is a schematic depiction of an airjet apparatus 200 for entraining coating particles for generating a coating-particle-entrained continuous or pulsed airjet or any other low-temperature or high-temperature fluidjet. As depicted in this figure, the airjet system 200 includes a compressor inlet 201 and a compressor 202 for pressurizing the apparatus. The apparatus 200 includes a reservoir (storage cylinder) 203 for storing a volume of pressurized air and also includes a pressure regulator 204, an air valve 205, and an air pressure gage 206. The airjet apparatus 200 further includes a coating particle hopper 207 for holding a supply of coating particles 208. A metering valve 209 is provided for metering the outflow of particles into a feed line leading to a pulsed or continuous nozzle 210. This pulsed or continuous nozzle generates, respectively, a pulsed or continuous particle-entrained airjet 211 for prepping a surface of a component or work piece 212. This work piece may be held in a jig, clamp, holding device or work piece support 213 as shown by way of example in this figure. The airjet system may optionally include a rotating device 214 to rotate the work piece.

As will be appreciated by those of ordinary skill in the art, the compressor 202 and reservoir 203 together constitute an example of a pressure source, as the term is used in the present specification, for pressurizing the fluid stream. As will also be appreciated by those of ordinary skill in the art, the coating particle hopper 207, the feed line leading from the hopper 207 to the nozzle 210, and metering valve together constitute an example of a particle delivery subsystem, as the term is used in the present specification, for delivering a supply of coating particles into the nozzle. A computer control system may be provided to control the operation of the airjet apparatus.

Figure 5:
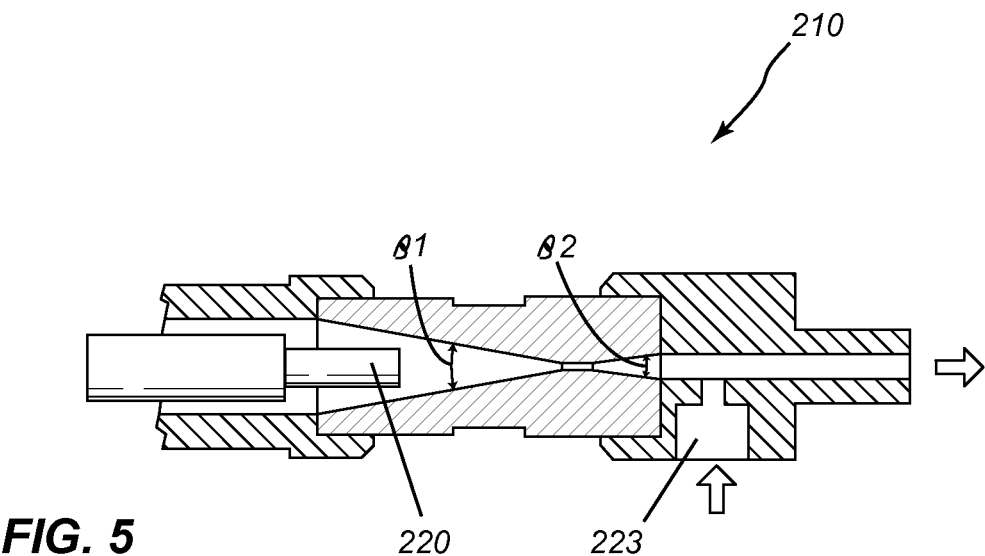
FIG. 5 is an illustration of a Laval (converging-diverging) nozzle for a continuous or pulsed airjet.
Figure 6:
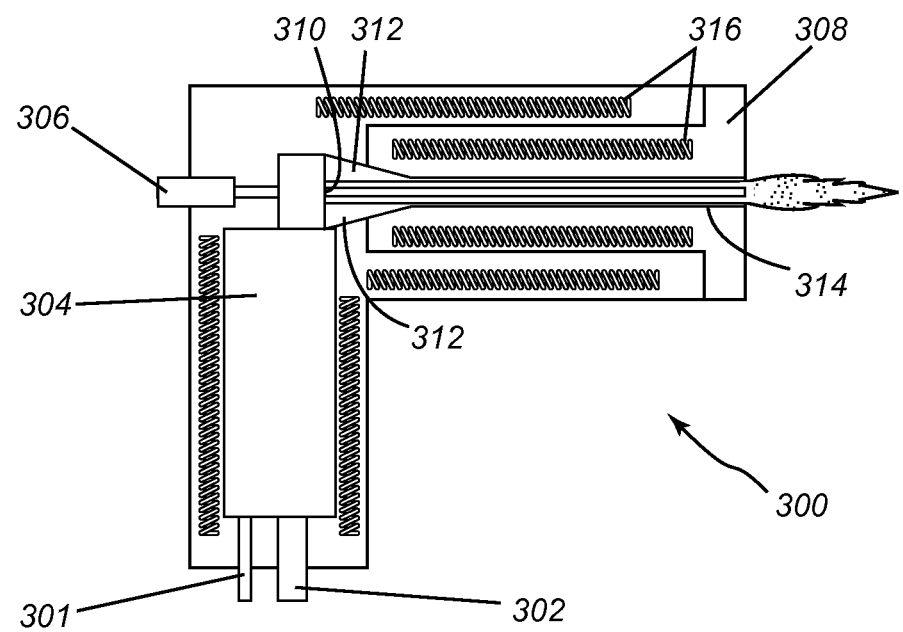
FIG. 6 is a schematic depiction of an HVOF apparatus operable in a first mode (without combustion) to prep the surface using the coating particle as a blasting particle and in a second mode (with combustion) to subsequently coat the surface using the same coating particle.

FIG. 5 is a schematic depiction of a Laval (converging-diverging) nozzle for generating a coating-particle-entrained continuous or pulsed airjet. In a preferred embodiment of the airjet system 200, the nozzle 210 is a Laval nozzle having a converging section followed by a diverging section as shown in the figure. The Laval nozzle, which was developed in 1897 by Swedish inventor Gustaf de Laval, is already known in the art, but can be used advantageously in the airjet apparatus. See, e.g. "Machining of Solid Materials by High Speed Airjet" by R. Kobayashi, Y. Fukunishi & T. Ishikawa published in *Jet Cutting Technology* (BHR Group; D Saunders, Editor) as Proceedings of the 10$^{th}$ International Symposium (Amsterdam, The Netherlands, 31 Oct.-2 Nov. 1990). As will be appreciated by those of ordinary skill in the art of fluid mechanics, the Laval nozzle may have either conical or bell-shaped sections.

As further depicted in FIG. 5, for a pulsed airjet, the airjet system 200 includes an oscillating magnetostrictive or piezoelectric transducer with a microtip 220 (akin the one described and illustrated above in relation to the force pulsed waterjet apparatus) for generating a pulsed airjet. This ultrasonic transducer with microtip 220 is located inside the nozzle 210 as shown in FIG. 5, with the microtip extending into the converging section of the Laval nozzle. A particle inlet 223 is preferably disposed downstream of the microtip 220.

Flow characteristics can be modulated by varying key parameters such as the diameter of the air inlet, diameter of the throat ($d_N$), diameter of the exit orifice ($d_e$), and the angles $\theta_1$ and $\theta_2$. These are all important parameters to generate a highly coherent and high-speed coating-particle-entrained continuous or pulsed airjet. Since the density of air is quite low, the operating pressures will be of the order of 1,000 psi (6.9 MPa).

Coating-Particle-Entrained Continuous Airjet

In another embodiment of this invention, the airjet can be a continuous airjet instead of a pulsed airjet. The continuous airjet can be pressurized to achieve the desired surface preparation effect. The continuous airjet can be generated using a standard airjet apparatus having no ultrasonic transducer or by deactivating the ultrasonic transducer in an ultrasonic airjet apparatus.

To summarize, in each of the four embodiments described above, the same coating particles that are to be subsequently used for coating the surface are also used as the blasting particles (abrasive particles) for first prepping the surface. The coating particles are entrained into the fluid stream, be it water or air, continuous or pulsed. The apparatus is designed so that the coating particles are preferably drawn into the nozzle downstream of the microtip connected to the forward end of the ultrasonic transducer to thereby avoid wearing the microtip.

FIG. 6 is a schematic depiction of a high-velocity oxy-fuel (HVOF) apparatus 300 used for an HVOF spray process. This apparatus directs coating particles at the surface in a first mode of operation with no combustion (a surface-prepping mode) and then delivers the same coating particles, albeit melted or liquefied by the heat, in a second mode of operation with combustion (coating mode).

As depicted in FIG. 6, this HVOF apparatus 300 has oxygen and fuel inlets 301, 302 that deliver oxygen and fuel, respectively, to a combustion chamber 304 for stoichiometric combustion of the fuel in the presence of the oxygen. This combustion generates the heat necessary to melt or liquefy the coating particles. The apparatus 300 includes a coating particle powder and carrier gas inlet 306 for injecting coating particles (typically in powder form). These coating particles are carried by a carrier gas (fluid stream). The coating particles and carrier gas are injected into the nozzle 308 via a powder feed port 310. The nozzle 308 also includes combustion gas feed ports 312. The coating particle powder and gas feed ports enable the powder to mix with the hot gases, so as to melt or liquefy the coating particle powder. The nozzle includes an outlet passage 314 through which the fluid-entrained coating particles are expelled. The HVOF apparatus 300 includes cooling passages 316 for heat transfer. These cooling passages 316 may be placed around the combustion chamber 304 and/or around the outlet passage 314.

For example, in the HVOF apparatus illustrated in FIG. 6, one can inject coating particles (larger size as the surface finish requires grit-blasted specs) in the powder inlet and carrier gas stage without combustion to prep the surface to be coated. This is similar to the airjet described above. After the surface is prepped, one can then inject coating particles into the fluid stream and initiate combustion to generate a high-temperature flame jet to coat the component. Therefore, the same system can be used for prepping and coating. This eliminates the conventional grit-blasting system, disposal of the grit-blasted waste (metal particles and grit particles), energy consumption and also the cleaning process that is usually necessary to clean the surface prior to coating, which contributes to the abatement of pollution. Furthermore, the coating particles used as blasting particles will gradually become smaller in size due to impact on the surface and eventually can be used for coating the surface. Therefore, an additional advantage is, in effect, there is no loss of particles. As these particles are quite expensive, a considerable cost savings can be achieved. While an HVOF apparatus is described, the principle of using the same coating particle for both prepping and coating may be used not only in HVOF, but also in any other thermal spray process, or by analogy with plasma spray or cold spray. For plasma spray, coating particles are used to prep the surface without ionization and then the same coating particles are used to coat the prepped surface with ionization. Similarly, for cold spray, the surface is prepped using coating particles at one velocity and then the same coating particles are used to coat the prepped surface at another velocity.

The embodiments of the invention described above are intended to be exemplary only. As will be appreciated by those of ordinary skill in the art, to whom this specification is addressed, many obvious variations, modifications, and refinements can be made to the embodiments presented herein without departing from the spirit and scope of the invention. The scope of the exclusive right sought by the applicant is therefore intended to be limited solely by the appended claims.

The invention claimed is:

1. A prepping and coating system comprising:

a nozzle comprising an ultrasonic transducer having a microtip that modulates a fluid stream, wherein the nozzle entrains coating particles into the fluid stream and directs the fluid stream carrying the coating particles at a surface to prep the surface, the coating particles thereby becoming smaller in size as the coating particles impinge on the surface;

wherein the nozzle is pulsed waterjet nozzle;

wherein said system includes a filter;

wherein said system, after the fluid system is directed at the surface to prep the surface, filters non-adhered coating particles and recycles reduced-sized, non-adhered particles and wherein said nozzle subsequently entrains and directs the recycled reduced-sized particles are smaller than the particles used to prep the surface, the nozzles comprising one or more particle inlets that inject the coating particles and the reduced-sized, non-adhered particles into the nozzle, the nozzle including a mixing chamber that mixes the coating particles with the fluid stream;

a container including the coating particles;

a particle delivery system connecting the container to the nozzle that delivers the coating particles into the nozzle, the particle delivery subsystem including a metering system that meters the coating particles;

a pump that pressurizes the fluid stream; and a control system that controls the particle delivery subsystem to control delivery of the coating particles into the nozzle.

2. The system as claimed in claim 1 wherein the ultrasonic transducer being driven by an ultrasonic generator.

3. The system as claimed in claim 1 wherein the particle delivery subsystem comprises a coating particle hopper, a feed line leading from the hopper to the nozzle, and a metering valve.

4. The system as claimed in claim 3 wherein the control system controls the metering valve to control delivery of the coating particles into the nozzle.

5. The system as claimed in claim 2 wherein the particle inlets are disposed downstream of the microtip.

6. The system as claimed in claim 1 wherein the mixing chamber has a constant cross-sectional area.

7. The nozzle as claimed in claim 1 wherein the nozzle comprises a converging or diverging section and a tube defining an exit orifice of the nozzle, wherein an upstream end of the converging or diverging section has a diameter equal to a diameter of a downstream end of the mixing chamber.

8. The nozzle as claimed in claim 7 wherein the nozzle comprises an adapter connected to the downstream end of the mixing chamber, the adapter having a bell-shaped diverging section, and wherein the tube connects to a downstream end of the adapter.

* * * * *

UNITED STATES PATENT AND TRADEMARK OFFICE
CERTIFICATE OF CORRECTION

Page 1 of 1

PATENT NO. : 8,691,014 B2
APPLICATION NO. : 13/111412
DATED : April 8, 2014
INVENTOR(S) : Vijay It is certified that error appears in the above-identified patent and that said Letters Patent is hereby corrected as shown below:

In the Claims,

Column 8
Line 52, Claim 1, Insert --a-- after "is"
Line 54, Claim 1, "system" should be --stream-- second occurrence
Line 58, Claim 1, Insert --, non-adhered particles at the surface to coat the surface, wherein the reduced-sized-- after "reduced-sized"
Line 66, Claim 1, "system" should be --subsystem--

Column 9
Line 8, Claim 2, "being" should be --is--

Signed and Sealed this
Thirtieth Day of June, 2015

Michelle K. Lee
*Director of the United States Patent and Trademark Office*